March 31, 1970  YASUO TANABE  3,503,314
PHOTOGRAPHIC EXPOSURE CONTROL SYSTEM
Filed May 8, 1967  2 Sheets-Sheet 1
FIG.1
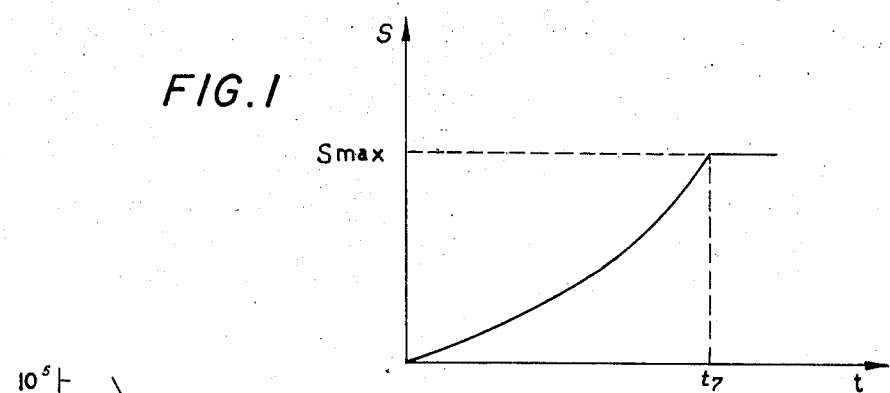
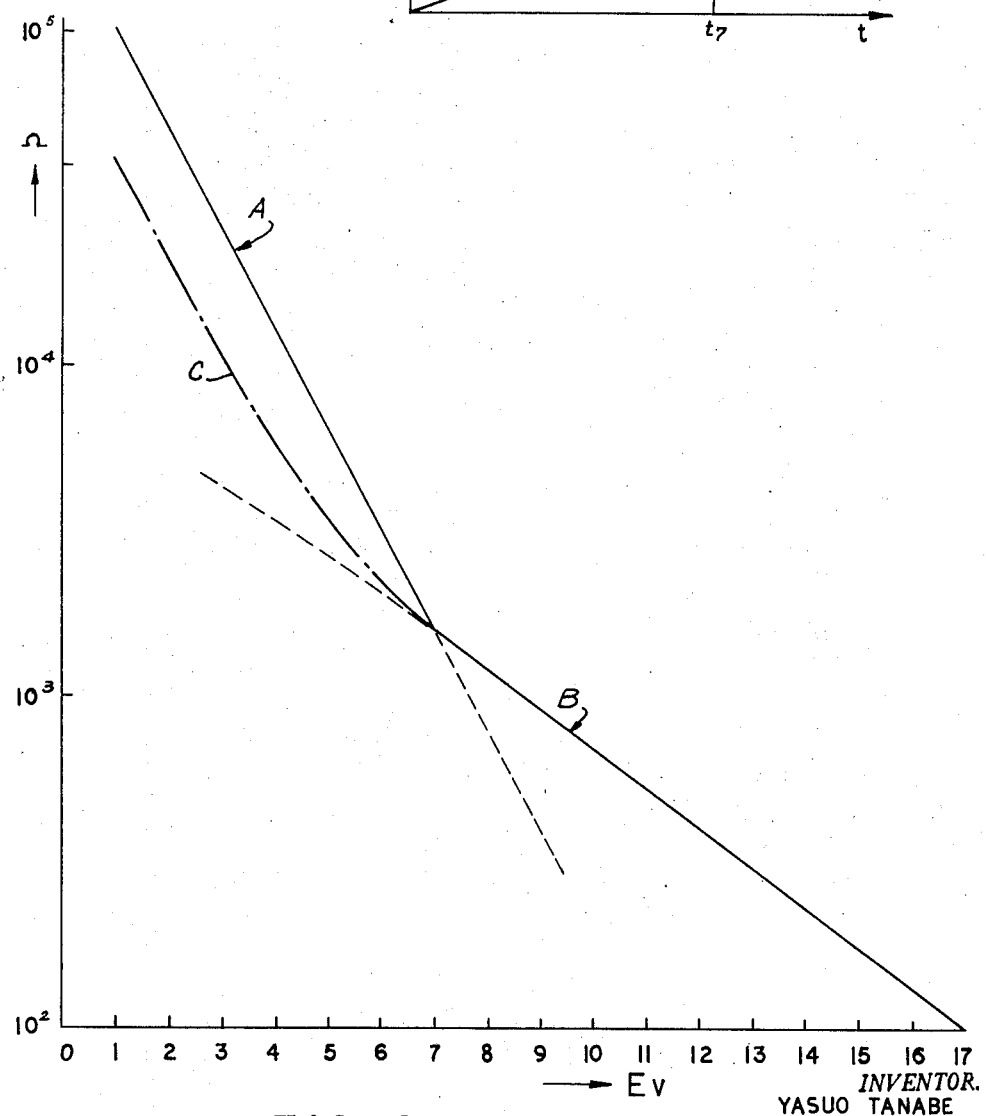
FIG.2
INVENTOR.
YASUO TANABE March 31, 1970  YASUO TANABE  3,503,314
PHOTOGRAPHIC EXPOSURE CONTROL SYSTEM
Filed May 8, 1967  2 Sheets-Sheet 2
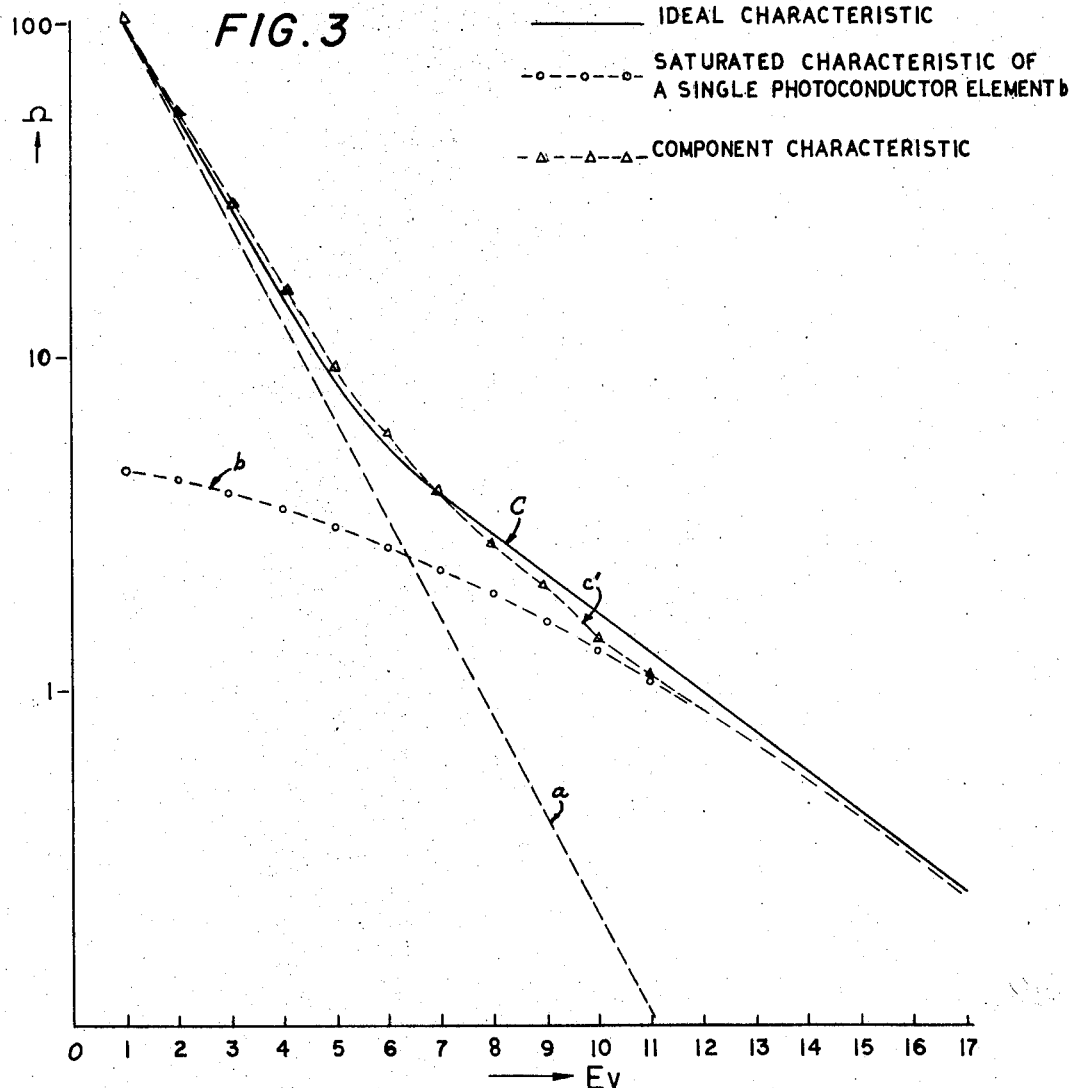
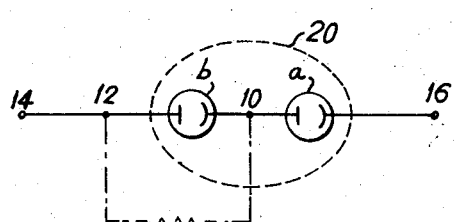
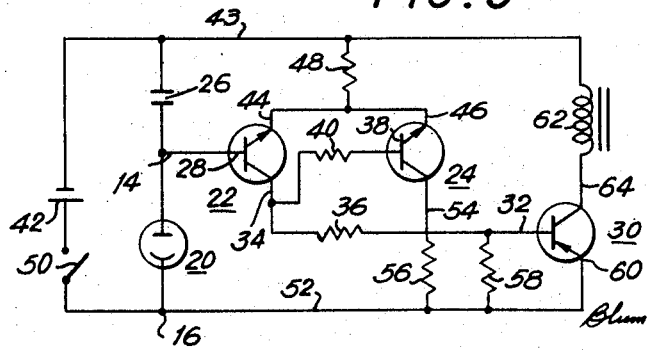
INVENTOR.
YASUO TANABE
BY
ATTORNEYS

United States Patent Office 3,503,314
Patented Mar. 31, 1970

3,503,314
PHOTOGRAPHIC EXPOSURE CONTROL SYSTEM
Yasuo Tanabe, Tokyo, Japan, assignor to Kabushiki Kaisha Hattori Tokeiten
Continuation-in-part of application Ser. No. 566,972, July 21, 1966. This application May 8, 1967, Ser. No. 636,694
Claims priority, application Japan, July 30, 1965, 40/62,151
Int. Cl. G01j 1/00
U.S. Cl. 95—10     5 Claims

ABSTRACT OF THE DISCLOSURE

An electronic photographic exposure control circuit comprising photoconductive cells including first and second photoconductive elements, having first and second photoresistive characteristics. The first and second photoresistive elements are connected to provide a combined photoresistive characteristic, wherein the first photoresistive characteristic will be dominant from the start of the shutter opening until the shutter is fully open, and the second photoresistive element will be dominant thereafter until the shutter is closed. In this way, the combined photoresistive characteristic will be a function of exposure time and aperture opening from the start of the shutter opening, until the shutter is fully open, and will be a function only of change of exposure time, after the shutter is fully opened, i.e. maximum aperture area.

---

This application is a continuation-in-part of my copending application Ser. No. 566,972 filed July 21, 1966, now abandoned.

The present invention relates to a photographic exposure control system and more particularly to a system for controlling the resistance characteristic of the photosensitive element in an exposure time control circuit.

In automatic shutter control systems, the shutter speed and the aperture are automatically determined in response to the light intensity of the object to be photographed. This is generally accomplished by means of an electronic control circuit comprising a photosensitive resistor whose resistance varies inversely with the intensity of the light impinging thereon. Accordingly, the delay time of an RC circuit comprising the aforementioned photosensitive resistor and a capacitor is determined thereby to produce an output pulse at the end of the RC delay period and thus initiate the closing of the shutters. In this way, the closing of the shutter blades is controlled by utilizing the output pulse of the photosensitive control circuit to operate a magnetic coil to thereby close the shutter blades and accordingly, obtain an exposure time determined by the light intensity of the object.

Due to the mechanical inertia of the shutter blades, however, a finite time elapsed from the moment that the shutter blades begin to open until they are fully opened. Thus, for very quick shutter speeds the diameter of the aperture is small whereas for relatively slow shutter speeds the shutter blades have sufficient time to open to the full aperture and a maximum aperture opening can be achieved. It is thus seen that the shutter speed i.e., exposure time will determine the maximum aperture opening. Therefore, in order to compensate for the incomplete aperture opening at fast shutter speeds, it is necessary to correct the shutter speed that would be otherwise obtained in a photosensitive control circuit for a particular light intensity of the object.

It is therefore an object of the present invention to provide an exposure control system whereby for a given level of object illumination, the correct shutter speed will be obtained for slow shutter speeds, as well as fast shutter speeds.

In accordance with the principles of the present invention, there was provided, in a camera exposure control circuit, a charging circuit which is adaptable for being selectively connected across a unipotential source, the charging circuit comprising a capacitor in series with the photoconductive means of the present invention. The photoconductive means of the present invention, comprises a first photoconductive element having a first photoresistance characteristic, and a second photoconductive element having a second photoresistance characteristic, with each of the first and second photoconductive elements having first and second output terminals respectively. The second output terminal of the first photoconductive element is electrically connected to the first output terminal of the second photoconductive element to form a junction terminal. Accordingly, upon connection of the above mentioned charging circuit across the unidirectional potential source, there is provided a time varient voltage at the junction terminal, this time varient voltage having an RC time constant whose resistance factor is a function of the sum of the first and second photoresistance characteristics.

The features of the present invention which are believed to be novel are set forth with particularity in the appended claims. The invention, itself, however, both as to its organization and method of operation, together with further objects and features thereof may best be understood with references of the following description taken in conjunction with the accompanying drawings wherein:

FIG. 1 shows a graphical relationship between the aperture area and exposure time in a typical camera.

FIG. 2 illustrates ideal photoresistance characteristics for the photosensitive element in the electronic exposure control circuit.

FIG. 3 illustrates available photoresistance characteristics of the photosensitive elements utilized in the exposure control circuit of the preferred embodiment of the present invention.

FIG. 4 is a schematic illustration of the electrical connection of the two component photoconductor elements which are combined to form the photoconductor combined element, which most nearly possess the desired photoresistance characteristic.

FIG. 5 is a schematic diagram of an electronic exposure control circuit utilizing the combined photoconductor element 20 of FIG. 4, in a preferred embodiment of the present invention.

FIG. 3 shows the resistance characteristics of two component photoconductors $a$ and $b$, e.g. cadmium sulphide cells, which are utilized in a series arrangement as a unitary photoconductor 20, to derive an equivalent combined characteristic $c'$, which very nearly approximates the desired ideal characteristic $c$, corresponding to Equation 9.

Referring to FIG. 3, it is seen that for minimum error in exposure time at low values of E.V., e.g., less than E.V.=10, it is desired that the $b$ characteristic be saturated. If the characteristic of the $b$ photoconductor is not sufficiently saturated at low values of E.V., an additional compensating variable resistor R may be connected in parallel across the terminals 10 and 12 of photoconductor $b$, as shown in FIG. 4. Said figure illustrates the series connection of first and second photoconductor elements $a$ and $b$ to provide a combined unitary photoconductor 20 to be utilized, as hereinafter explained, in a photoelectric exposure control circuit, as shown in FIG. 5. The other component photoconductor $a$, is serially connected, e.g. by soldering, as shown in FIG. 4, to component photoconductor $b$ at common terminal 10, with external terminal 16 of photoconductor element 20 being connected to positive supply lead 52, and external terminal 14 connected to base 28 as hereinafter described.

Referring to FIG. 5 there is shown a photoelectric exposure control circuit wherein the above-described combined photoconductor 20, whose resistance characteristic is shown as curve $C^1$ in FIG. 3, may be suitably utilized for driving the shutter in conjunction with a shutter arrangement as described in U.S. Letters Patent No. 3,373,672 issued on Mar. 19, 1968.

An index number system of exposure values is commonly used to indicate the relative light to the image, with the exposure value number being a function of the exposure time i.e., speed, and F number i.e., aperture opening. A typical table of exposure values i.e., E.V. No., corresponding to various aperture openings and speeds is as follows:

TABLE

| E.V. No. | 17 | 12 | 7 | 6 | 5 | 4 | 3 | 2 | 1 |
|---|---|---|---|---|---|---|---|---|---|
| Speed, sec | 1/512 | 1/128 | 1/32 | 1/16 | 1/8 | 1/4 | 1/2 | 1/2 | 2/1 |
| F/No | 16 | 5.6 | 2 | 2 | 2 | 2 | 2 | 2 | 2 |

The relationship between the aperture area S and exposure time $t$ may be expressed as follows, where A is a constant:

$$S = At^{3/2} \qquad (1)$$

Thus, the amount of light L passing through the shutter aperture over a period of time $t$ may be expressed as:

$$\begin{aligned} L &= \int At^{3/2} dt \\ &= \tfrac{2}{5} At^{5/2} + C \end{aligned} \qquad (1A)$$

From the data of the table, it will be evident that the value of change of E.V. number with speed and aperture, for E.V. values greater than 7 will be different than the rate of change for E.V. values less than 7. Now, it is understood that in the photoelectric exposure control system the exposure time is a function of the photoconductor resistance, and that for a given photoconductor there is a given resistance characteristic. Therefore, a particular photoconductor which may be suitable for E.V. values less than 7 will not be suitable for values of E.V. greater than 7.

The present invention is therefore directed to the solution of the above problem by providing a photoresistive element in a photoelectric exposure control circuit, the photoresistive element having a resistance characteristic equivalent to the combination of two individual photoconductors, one corresponding to the low values and the other to the higher values of E.V. numbers.

The mathematical expression for the resistance characteristic required by the photoconductor utilized in the present invention will now be derived, with reference to the aperture area S, exposure time $t$, and quantity of light L, passing through the shutter aperture.

Since the initial condition i.e., $t=0$, $L=0$, therefore the constant $C=0$. Thus, $$L = \tfrac{2}{5} At^{5/2} \qquad (2)$$

Now it can be shown that the light quantity L doubles for each unit in the E.V. number as the E.V. number is decreased. Thus, comparing the light quantities for E.V. numbers 17 and 12, i.e., a difference of 5 numbers, the ratio of $L_{17}$ to $L_{12}$ is shown to be $2^5$, by substituting the corresponding exposure times $t$, into Equation 2 given above. Thus, the exposure time for $L_{12}$ is $\frac{1}{128}$ sec. which is 4 times the exposure time for $L_{17}$ which is $\frac{1}{512}$.

Thus, $$\frac{L_{12}}{L_{17}} = \frac{2/5 A (4t)^{5/2}}{2/5 A t^{5/2}} = 2^5$$

Referring to FIG. 1, there is shown the graphical relationship between the aperture area S and exposure time $t$. As shown in FIG. 1, and referring to the table, it is seen that the aperture area S will reach a maximum value at an exposure time corresponding to an E.V. number of 7, i.e., at a time of $t_7$.

Thus, $$S_{\max} = A t_7^{3/2} \qquad (3)$$

Referring to FIG. 1, the curve of aperture area S, versus time $t$, may be expressed as $$S = At^{3/2} \qquad (0 \leq t \leq t_7) \qquad (4)$$

$$S = At \qquad (t_7 \leq t) \qquad (5)$$

Now, the total amount of light passing through the shutter aperture over the interval from time 0 to time $t$, as indicated in Equation 1A, can be expressed as:

$$L = A \int_0^{t_7} t^{3/2} dt + A \int_{t_7}^{t} t_7^{3/2} dt \, (t_7 \leq t) \qquad (6)$$

where A is a constant $=1$.

At an exposure time of $t_n$, corresponding to E.V. number $=n$, then the total amount of light passing through the shutter aperture may be expressed as $$L_n = \int_0^{t_7} t^{3/2} dt + t_7^{3/2} (t_n - t_7) \qquad (7)$$

But $$L_n = 2^{7-n} L_7 \qquad (n \leq 7) \qquad (8)$$

Combining Equations 7 and 8 we get $$2^{7-n} L_7 = L_7 + t_7^{3/2} (t_n - t_7)$$

$$t_n = t_7^{-3/2} + L_7 (2^{7-n} - 1) + t_7$$

$$= \frac{t_7}{5}(3 + 2^{8-n}) \qquad 0 \leq t \leq t_7$$

$$t_7 \leq t \qquad (9)$$

Thus, an ideal photoconductor characteristic can be approached by a characteristic which is a function of exposure time and aperture opening from the start of the shutter opening until the shutter is fully open, i.e., $t_7$, and is a function only of change of exposure time after the shutters have fully opened, i.e., maximum aperture area.

Referring to FIG. 2, it is seen that ideally the photosensitive element in the electronic exposure control circuit is required to have a first, A, constant slope (i.e., linear) resistance characteristic in the region of E.V. values from 0–7, and a second, B, constant slope resistance characteristic in the region of E.V. values from 7–17. It is understood, referring also to FIG. 1, that if the photoconductor in the control circuit has a B characteristic, the resultant exposure error will become smaller as the exposure time is increased, but that for intermediate and high speeds, the exposure error may approach 50%.

The graphical illustration of Equation 9 which represents the characteristic C of a single photoconductor which most nearly approximates the ideal photoconductor resistance characteristic of characteristic A and B of FIG. 2, is shown as characteristic C in FIGS. 2 and 3.

The transistorized exposure control circiut of FIG. 5 comprises a Schmitt trigger circuit including a pair of transistors 22 and 24 which are alternately rendered conductive and non-conductive, respectively. A series RC charging circuit comprises combination photoconductor element 20, in series arrangement with charging capacitor 26 with the junction of element 20 and capacitor 26 being connected to the input of the aforementioned Schmitt trigger circuit at base 28 of transistor 22. A driving transistor 30 has its base 32 connected to the collector 34 of transistor 22 through coupling resistor 36, with the output of transistor 22 at 34 being coupled to the base 38 of transistor 24 through coupling resistor 40.

A bias supply voltage is provided by battery source 42 having its negative terminal connected to negative supply voltage lead 43 which is connected to the upper end of charging capacitor 26. The emitters 44 and 46 of transistors 22 and 24 respectively, are connected together to one end of common emitter resistor 48, with the other end of common emitter resistor 48 being connected to the negative supply lead 43. A single pole double throw switch 50, which is operative to apply the supply voltage of D.C. source 42, to the Schmitt trigger circuit of FIG. 5, is connected between the positive terminal of D.C. source 42 and positive supply voltage lead 52.

Collector 54 is connected to supply lead 52 through load resistor 56, and base 32 of transistor 30 is connected to supply lead 52 through its input resistor 58, while emitter 60 thereof is connected directly to supply lead 52. A magnetic coil 62 is provided for driving the camera shutter blades (not shown) and is connected between the collector 64 of transistor 60 and the negative supply lead 43.

The operation of the electronic control circuit of FIG. 5 is as follows. When shutter control switch 50 is depressed, D.C. source 42 provides a positive bias potential difference between leads 52 and 43 respectively, thereby causing current to flow from the positive terminal of D.C. source 42, through closed switch 50, and through the series charging circuit of photosensitive element 20 and charging capacitor 26. A charge, increasing with time, is developed across the plates of capacitor 26, at a rate determined by the RC time constant of the aforementioned series charging circuit, thereby causing the potential at base 28 to rise accordingly.

When the voltage charge developed across capacitor 26 is less than the voltage on emitters 44 and 46 of transistors 22 and 24 respectively, base current will flow from emitter 44 to base 28 making transistor 22 conductive, and causing current to flow through common emitter resistor 48 to thereby develop a voltage thereacross, which is utilized as a reference voltage.

When transistor 22 becomes conductive, transistor 30 will also become conductive, by virtue of current flowing through resistors 36 and 58, with current flowing from the positive terminal of battery source 42, through emitter 60 to collector 64 of transistor 30, through magnetic coil 62 causing magnetic coil 62 to energize. Thus, the delay which corresponds to the RC time constant of the series charging circuit of capacitor 26 and photoconductor 20, i.e., exposure time, will be inversely proportional to the illumination of the object photograph. It will be noted that the RC delay time is proportional to the product of the capacitance of capacitor 26 and the resistance of photoconductor 20. The resistance of photoconductor 20, as shown by curve $c^1$ of characteristic curve of FIG. 3, is a function of each of the resistance characteristics of photosensitive elements $a$ and $b$, as described above, which compensates for exposure errors which would otherwise result at slow shutter speeds. Hence, by utilization of the combination of photoconductor elements $a$ and $b$, shown in combination as photoconductor 20 in the electronic exposure control circuit of FIG. 5, in accordance with the principles of the present invention, conditions are obtained whereby for a given level of object illumination, the correct shutter speed, i.e., exposure time, will be obtained for slow shutter speeds as well as fast shutter speeds.

While there has been shown particular embodiments of the present invention, it will be understood that it is not wished to be limited thereto, since modifications can be made in the circuit arrangement of the preferred embodiment of the present invention, and it is contemplated in appended claims to cover any such modifications as fall within the time spirit and scope of the present invention.

What is claimed is:

1. In a camera exposure control circuit, a charging circuit means for determining exposure time, a unidirectional potential source, means for selectively connecting said charging circuit means across a unidirectional potential source, said charging circuit means comprising a capacitor in series with photoconductive means to form a junction terminal, said photoconductive means comprising a first component photoconductive element having a first photoresistance characteristic, and a second component photoconductive element having a second photoresistance characteristic, each of said first and second photoconductive elements having first and second output terminals respectively, said second output terminal of said first photoconductive element being electrically connected to said first output terminal of said second photoconductive element, said first and second photoconductive elements being disposed for exposure to the same light source, said charging circut means, upon connection across said unidirectional potential source, providing a time variant voltage at said junction terminal, said time varying voltage having an RC time constant whose resistance factor is a function of the sum of said first and second photoresistance characteristics.

2. In a camera exposure control circuit, a charging circuit as defined in claim 1 wherein said first photoresistance characteristic is selected to dominate said charging circuit resistance factor at low exposure values, and where said second photoresistance characteristic is selected to dominate said charging circuit resistance factor at high exposure values.

3. In a camera exposure control circuit, a charging circuit as defined in claim 2 including a resistor connected across said first and second output terminals of said second photoconductive element selected to saturate said second photoresistance characteristic at low exposure values.

4. A camera exposure control circuit comprising a solenoid coil for attracting and releasing camera shutter blades, switching circuit means for selectively energizing and de-energizing said solenoid coil, said switching circuit having an input terminal and a pair of output terminals connected across said solenoid, charging circuit means, a unipotential source, means for selectively connecting said charging circuit across said unipotential source, said charging circuit means comprising a capacitor in series with photoconductive means to form a junction terminal, said photoconductive means comprising a first photoconductive element having a first photoresistance characteristic, and a second photoconductive element having a second photoresistance characteristic, each of said first and second photoconductive elements having first and second output terminals, said second output terminal of said first photoconductive element being electrically connected to said first output terminal of said second photoconductive element, said junction termial being connected to said switching circuit means input terminal, said charging circuit means, upon connection across said unipotential source, providing an exponentially time varying voltage at said junction terminal, said time varying voltage having an RC time constant whose resistance factor is a function of the sum of said first and second photoresistance characteristics, said switching circuit means being operative to energize said solenoid coil at a time, subsequent to the connection of said charging circuit means across said unipotential source, as determined by the RC time constant of said charging circuit means, whose resistance factor is a function of the sum of said first and second photoresistance characteristics.

5. A camera exposure control circuit as defined in claim 4 wherein said switching circuit means comprises, a Schmitt trigger circuit having first and second transistors, and a common emitter resistor having one end thereof connected to the junction of the emitters of said first and second transistors and the other end thereof connected to said unipotential source, to provide a voltage reference constituting the voltage developed across said common emitter resistor for comparison with the voltage across said charging circuit means.

References Cited
UNITED STATES PATENTS

| | | |
|---|---|---|
| 3,001,443 | 9/1961 | Stimson 356—222 XR |
| 3,165,989 | 1/1965 | Kiper. |
| 3,245,332 | 4/1966 | Kagan. |
| 3,286,097 | 11/1966 | Norwood. |
| 3,373,672 | 3/1968 | Ichijo et al. 95—63 |
| 3,421,812 | 1/1969 | Kubota. |

NORTON ANSHER, Primary Examiner

DAVID S. STALLARD, Assistant Examiner